(12) United States Patent
Setsuda et al.

(10) Patent No.: US 11,867,636 B2
(45) Date of Patent: Jan. 9, 2024

(54) MEASUREMENT DEVICE AND MEASUREMENT METHOD FOR MEASURING A PHYSICAL QUANTITY OF A SHEET

(71) Applicant: YOKOGAWA ELECTRIC CORPORATION, Tokyo (JP)

(72) Inventors: Kazuki Setsuda, Tokyo (JP); Hitoshi Hara, Tokyo (JP); Yasushi Ichizawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 763 days.

(21) Appl. No.: 16/984,185

(22) Filed: Aug. 4, 2020

(65) Prior Publication Data

US 2020/0363340 A1 Nov. 19, 2020

Related U.S. Application Data

(63) Continuation of application No. PCT/JP2019/004754, filed on Feb. 8, 2019.

(30) Foreign Application Priority Data

Feb. 8, 2018 (JP) ................................ 2018-021447

(51) Int. Cl.
*G01N 21/86* (2006.01)
*G01B 11/06* (2006.01)
*G01N 21/3559* (2014.01)

(52) U.S. Cl.
CPC ......... *G01N 21/86* (2013.01); *G01B 11/0691* (2013.01); *G01N 21/3559* (2013.01); *G01N 2021/869* (2013.01); *G01N 2021/8618* (2013.01); *G01N 2021/8663* (2013.01)

(58) Field of Classification Search
CPC ............ G01N 2201/065; G01N 21/86; G01N 21/3559; G01N 2021/8618;
(Continued)

(56) References Cited

U.S. PATENT DOCUMENTS 4,120,582 A * 10/1978 De Vries .............. G01N 21/474
356/73
4,277,177 A 7/1981 Larsen
(Continued)

FOREIGN PATENT DOCUMENTS

CN 103403531 A 11/2013
EP 2026059 A1 2/2009
(Continued)

OTHER PUBLICATIONS

International Search Report and (ISA/237) Written Opinion of the International Search Authority for International Patent Application No. PCT/JP2019/004754, issued/mailed by the Japan Patent Office dated May 13, 2019.
(Continued)

*Primary Examiner* — Jennifer D Bennett
*Assistant Examiner* — Erin R Garber

(57) ABSTRACT

A measurement device to measure a physical quantity of a measurement target having a sheet-like shape is provided, including: a first integrating sphere which is separated by a gap from a first surface of the measurement target, has a first opening facing the first surface, and is not provided with a light detector to detect an intensity of light; a second integrating sphere which is separated by a gap from a second surface of the measurement target, where the second surface is positioned opposite to the first surface, and has a second opening facing the first opening with the measurement target sandwiched therebetween; a light source to emit light into the first integrating sphere; a light detecting unit to detect an
(Continued)

intensity of light inside the second integrating sphere; and a calculating unit to calculate the physical quantity of the measurement target based on the intensity of the detected light.

12 Claims, 11 Drawing Sheets

(58) Field of Classification Search
CPC ..... G01N 2021/8663; G01N 2021/869; G01N 21/23; G01B 11/0691; G01B 11/24; G01B 11/306; G01B 11/06; G01J 3/0254; G01J 2001/0481
See application file for complete search history.

(56) References Cited

U.S. PATENT DOCUMENTS

| | | | |
|---|---|---|---|
| 4,748,329 A | | 5/1988 | Cielo |
| 2007/0236699 A1 | | 10/2007 | Chou |
| 2013/0313444 A1* | | 11/2013 | Simonian ............... G01N 21/64 250/459.1 |

FOREIGN PATENT DOCUMENTS

| | | | |
|---|---|---|---|
| JP | S56168502 | A | 12/1981 |
| JP | S6335949 | U | 3/1988 |
| JP | H07103722 | A | 4/1995 |
| JP | 3057270 | B2 | 6/2000 |
| JP | 2004361149 | A | 12/2004 |
| JP | 2012063333 | A | 3/2012 |
| JP | 2016095258 | A | 5/2016 |
| TW | 200739033 | A | 10/2007 |
| WO | 03040649 | A1 | 5/2003 |

OTHER PUBLICATIONS

Office Action issued for counterpart Taiwanese Application 108104375, issued by the Taiwan Intellectual Property Office dated Nov. 21, 2022.

Office Action issued for counterpart Korean Application 10-2020-7021361, issued by the Korean Intellectual Property Office dated Apr. 26, 2021.

* cited by examiner

MEASUREMENT DEVICE AND MEASUREMENT METHOD FOR MEASURING A PHYSICAL QUANTITY OF A SHEET

CROSS REFERENCE TO RELATED APPLICATION

This is a continuation application of International Application No. PCT/JP2019/004754, filed on Feb. 8, 2019, which claims priority to Japanese Patent Application No. 2018-021447, filed on Feb. 8, 2018, the contents of each of which are incorporated herein by reference.

BACKGROUND

1. Technical Field

The present invention relates to a measurement device and a measurement method.

2. Related Art

Conventionally, a transmittance and the like of a measurement target have been measured by emitting light to the measurement target and detecting the reflected light and the transmitted light. It has been known that a physical quantity such as the transmittance can be precisely measured by using an integrating sphere to measure the reflected light and the transmitted light (For example, see Patent Document 1 and 2). It has also been known that reference light and measurement light with different optical wavelengths from each other are emitted to a measurement target (For example, see Patent Document 3 and 4).

Patent Document 1: Japanese Unexamined Patent Application, Publication No. 2004-361149.
Patent Document 2: Japanese Unexamined Patent Application, Publication No. 2012-63333.
Patent Document 3: Japanese Unexamined Patent Application, Publication No. Sho56-168502.
Patent Document 4: Japanese Unexamined Patent Application, Publication No. 2016-95258.

SUMMARY

However, in the case that a measurement target is birefringent, or in the other cases, interference may occur in the reflected light, making the accurate measurement of the physical quantity difficult.

DESCRIPTION OF EXEMPLARY EMBODIMENTS

Hereinafter, the present invention will be described through embodiments of the invention. However, the following embodiments shall not limit the claimed invention. Also, every combination of features described with respect to the embodiments should not be considered essential to means provided by aspects of the invention.

Figure 1:
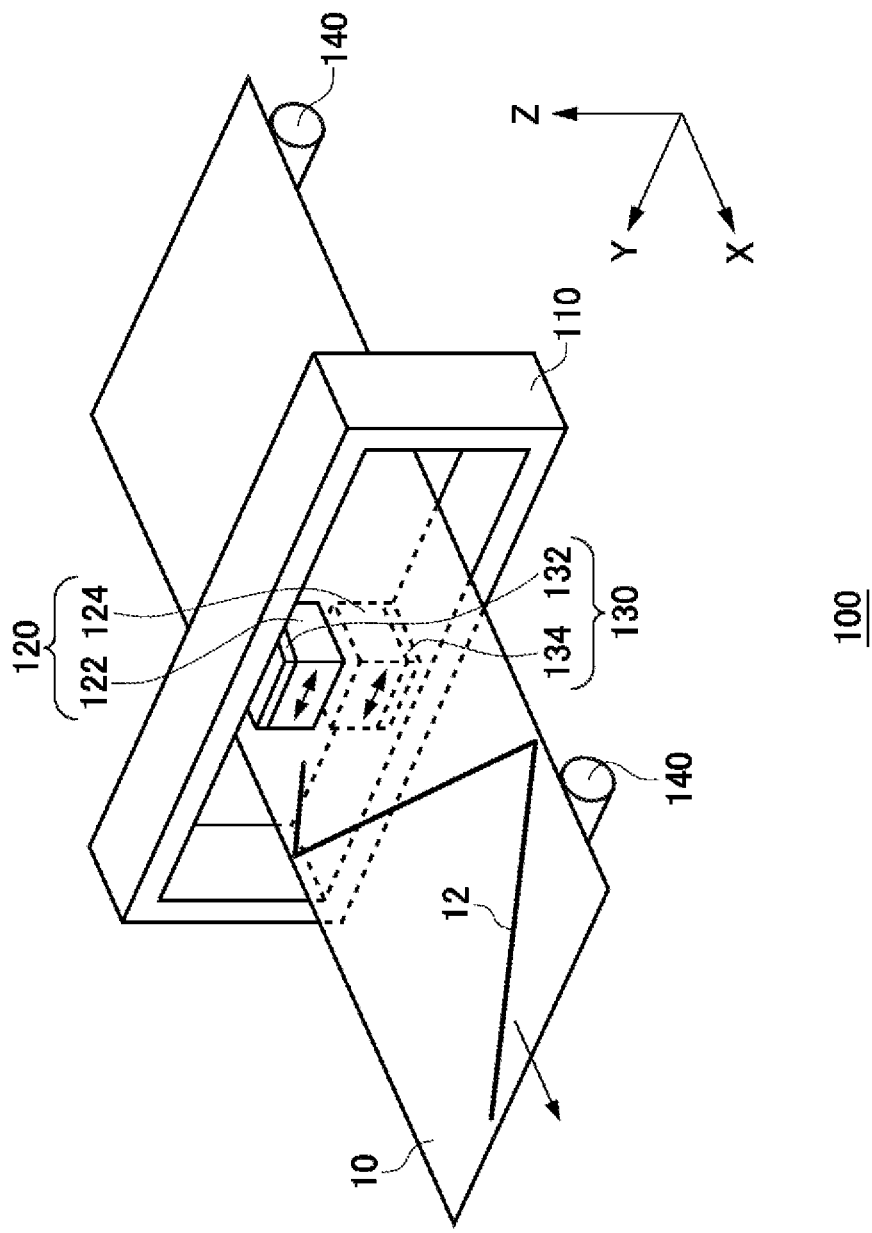
FIG. 1 shows a configuration example of a measurement device 100 according to the present embodiment along with a measurement target 10.

FIG. 1 shows a configuration example for the measurement device 100 according to the present embodiment along with the measurement target 10. The measurement target 10 may have a sheet-like shape. The measurement target 10 has a thickness, for example, approximately from several micrometers to several millimeters. The measurement target 10 also has, for example, a predetermined width. The measurement target 10 may also have a shape which is continuous in the longitudinal direction. The measurement target 10 is stretched, for example, in the longitudinal direction. The measurement target 10 has, for example, a width of approximately several meters. FIG. 1 shows an example in which the measurement target 10 has a predetermined width in the y direction, and the x direction is the longitudinal direction. The measurement target 10 also includes at least a material of, for example, paper and resin (PET and the like).

The measurement device 100 according to the present embodiment measures a physical quantity of the measurement target 10 with such a sheet-like shape without using the reflected light intensity from the front surface and the back surface of the measurement target 10. The present embodiment describes an example in which a physical quantity detected by the measurement device 100 is the thickness of the measurement target 10. The measurement device 100 includes a frame 110, a measuring head 120, a head-moving unit 130, and a target-moving unit 140.

The frame 110 includes an opening for the measurement target 10 to pass. FIG. 1 shows an example in which the position of the frame 110 is fixed and the measurement target 10 is carried in the x direction. The measuring head 120 is mounted inside the opening of the frame 110 such that physical quantities of the measurement target 10 passing through the opening can be measured.

The measuring head 120 includes optical components such as a light source and a light detector and optically measures the physical quantities of the measurement target 10. The measuring head 120 includes a first head 122 and a second head 124. The first head 122 faces the first surface of the measurement target as, while the second head 124 faces the second surface of the measurement target, which is positioned opposite to the first surface. FIG. 1 shows an example in which the surface of the measurement target 10 facing in the +z direction is referred to as a first surface, and the surface facing in the −z direction is referred to as a second surface.

The first head 122 and the second head 124 are provided such that they are facing each other with the measurement target 10 sandwiched therebetween. That is, the first head 122 and the second head 124 are arranged such that when measurement light is emitted from any one of the first head 122 and the second head 124 to the measurement target 10, the measurement light passing through the measurement target 10 can be detected by the other of the first head 122 and the second head 124. Such a detection of the physical quantities by the measuring head 120 will be described below.

The head-moving unit 130 moves the measuring head 120 in a direction approximately perpendicular to the conveying direction of the measurement target 10. That is, the head-moving unit 130 moves the measuring head 120 in the width direction. In other words, the head-moving unit 130 fixes the measuring head 120 to the frame 110 such that the measuring head 120 can move in the y direction. The head-moving units 130 include a first head-moving unit 132 and a second head-moving unit 134.

The first head-moving unit 132 moves the first head 122 in the width direction on the first surface side with respect to the measurement target. The second head-moving unit 134 moves the second head 124 in the width direction on the same side of the measurement target as the second surface. The first head-moving unit 132 and the second head-moving unit move the first head 122 and the second head 124 in the width direction while the first head 122 and the second head 124 face each other with the measurement target 10 sandwiched therebetween. Therefore, it is preferable that the measuring head 120 can continue measuring the measurement target 10 while it is moved by the head-moving unit 130.

The target-moving unit 140 carries the measurement target 10 in the longitudinal direction. In the example of FIG. 1, as shown in an arrow, the conveying direction in which the target-moving unit 140 moves the measurement target 10 is approximately parallel to the x direction. The target-moving unit 140 has, for example, rollers and the like on the first surface and/or the second surface of the measurement target 10 to carry the measurement target 10. The target-moving unit 140 may also carry the measurement target 10 by reeling the measurement target 10 with a roller and the like.

The above-described head-moving unit 130 and the target-moving unit 140 may function as a cooperating moving unit. That is, the moving units move the measuring head 120 relative to the measurement target 10 in the plane direction. For example, the moving units reciprocate the measuring head 120 in the width direction of the measurement target 10 while moving the measurement target 10 in the longitudinal direction. In this way, the moving unit may relatively move the measuring head 120 in a zigzag course in the plane direction of the measurement target 10. Therefore, the measuring head 120 can preferably measure a physical quantity of the measurement target 10 in any positions.

FIG. 1 depicts the relative moving direction of the measuring head 120 in the plane direction of the measurement target 10 as the measurement line 12. The measuring head 120 measures physical quantities of the measurement target 10 on the measurement line 12. It is preferable that the moving units continuously move the measuring head 120 relative to the measurement target 10 while the measuring head 120 for the measurement target 10 are conducting measurement.

It is noted that, in the above described example, the measurement device 100 according to the present embodiment includes the head-moving unit 130 and the target-moving unit 140, but the present embodiment is not limited thereto. For example, the measurement device 100 may simply include any one of the head-moving unit 130 and the target-moving unit 140. The measurement device 100 may also include a plurality of measuring head 120. In this case, the measurement device 100 may include a head-moving unit 130 which moves the plurality of measuring heads 120 individually. The measurement device 100 may also include a frame-moving unit which moves the frame 110, instead of the target-moving unit 140 which moves the measurement target 10.

When measurement light is emitted from, for example, the first head 122 to the measurement target 10 in the above-described measurement device 100, the reflected light from the front surface of the measurement target 10 is directed toward the first head 122 and the transmitted light which transmitted through the measurement target 10 is directed toward the second head 124. Based on such reflected light and transmitted light, various physical quantities, such as light absorption amount, light absorbance, light absorption coefficient, and light transmittance of the measurement target 10 for the measurement light, and water content, thickness, and grammage of the measurement target 10, can be measured.

For example, light absorption amount $I_{ABs}$, light absorbance $C_{ABs}$, and light transmittance C of the measurement target 10 for the measurement light can be expressed in the following equation:

$$I_{ABS}=(I_{IN}-I_{REF})-I_{TR}$$

$$C_{ABS}=I_{ABS}/(I_{IN}-I_{REF})$$

$$C_{TR}=I_{TR}/(I_{IN}-I_{REF}) \quad \text{(Equation 1)}$$

wherein $I_{IN}$ is the intensity of measurement light, $I_{REF}$ is reflected light intensity, and $I_{TR}$ is the transmitted light intensity.

The following equation also holds true:

$$(I_{IN}-I_{REF})\exp(-\alpha t)=I_{TR} \quad \text{(Equation 2)}$$

wherein t is the thickness of the measurement target 10 and α is the light absorption coefficient.

It has been known that the various physical quantities can be measured by using a light detector for detecting reflected light provided on the first head 122 and a light detector for detecting transmitted light provided on the second head 124 to detect reflected light intensity ($I_{REF}$) and transmitted light intensity ($I_{TR}$), respectively. It is noted that the intensity of measurement light $I_{IN}$ may be detected with the light detector of the first head 122. Alternatively, the relationship between the current and/or voltage and the like supplied to the light source and the light output may be observed in advance to calculate the intensity of measurement light $I_{IN}$ based on the supplied amount of current and/or voltage and the like.

However, as the reflected light intensity of the measurement target 10 increases, the intensity of reflected light may vary due to the occurrence of interference. That is, this may cause an error between the detection result of the reflected light intensity ($I_{REF}$) and the intensity of light actually reflected. Accordingly, it has been known that the influence of such an interference can be reduced when the incidence angle of measurement light entering the measurement target 10 is Brewster angle, which inhibits the occurrence of reflected light. However, when the measurement target 10 is birefringent, the occurrence of reflected light can be inhibited on the front surface of the measurement target 10, while reflection may occur on the back surface. Here, the birefringence refers to the property which causes a part of linearly polarized light entering into a material changes to elliptically polarized light due to the rotation of polarization axis.

Figure 2:
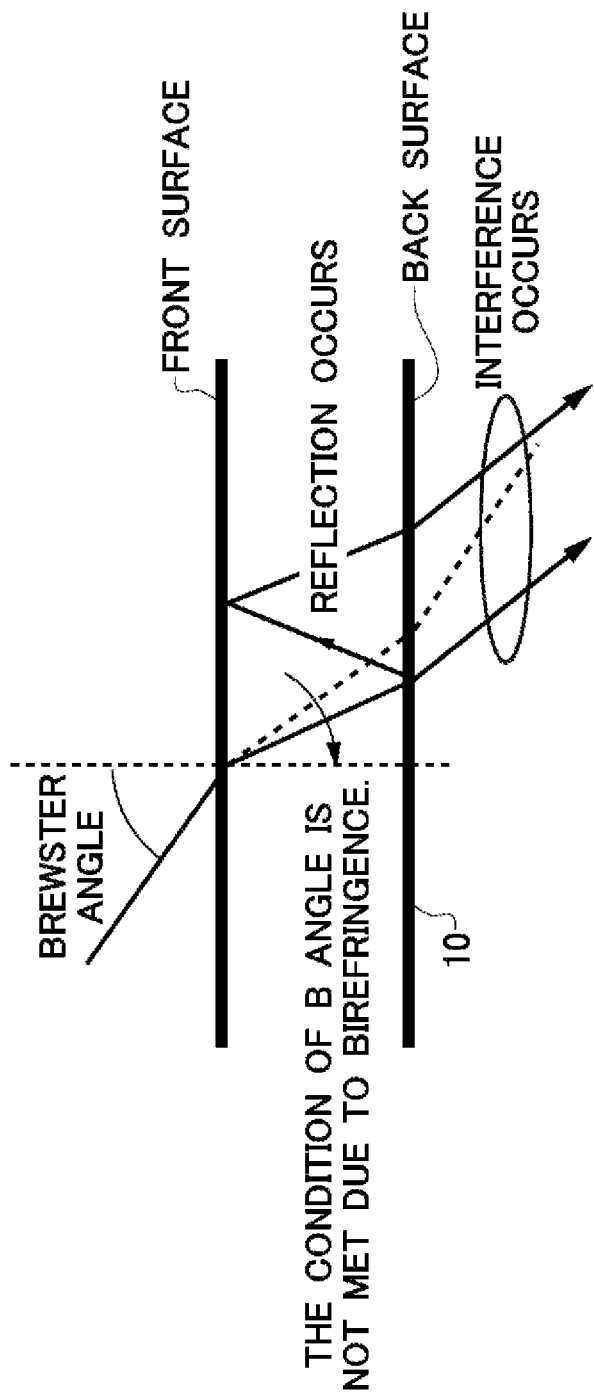
FIG. 2 shows an example for measurement light entering the measurement target 10 according to the present embodiment at Brewster angle.

FIG. 2 shows an example in which the measurement light enters into the measurement target 10 according to the present embodiment at Brewster angle. FIG. 2 shows an example in which interference occurs due to birefringence of the measurement target 10, despite P polarized measurement light entering at Brewster angle. The measurement light entering from the front surface of the measurement target 10 transmits through the measurement target 10 and then reaches the back surface of the measurement target 10. If the measurement target 10 is birefringent, a part of the P polarized measurement light changes to elliptically polarized light on the back surface of the measurement target 10 and a part of the elliptically polarized light is reflected. Even if the measurement light enters at Brewster angle, such a reflection may cause interference and the like on the front surface and the back surface of the measurement target 10, resulting in an unnatural behavior of the measurement result for the physical quantities.

PET is usually produced by biaxial stretching. The biaxial stretching refers to elongating (stretching) thermoplastic resin (plastic) in the direction of length and width. Such a stretching enables the measurement target 10 to be thinned. Additionally, mechanical strength and/or optical property can be given to the measurement target 10 by controlling the stretching force in each axial direction to adjust the molecular orientation.

In this way, when the measurement target 10 is stretched with the both ends (edges) being held, a bowing phenomenon may occur, a phenomenon in which the direction and strength of the molecular orientation change in the width direction. For example, if a straight line is drawn on a film web prior to stretching of the measurement target 10, the straight line may convert into an arc in the measurement target 10 after stretching. The bowing phenomenon causes a distribution of optical property which varies across the front surface of the measurement target 10. In this case, even if the incidence angle of the measurement light is arranged so that the influence of the reflection is reduced, the reflectance and the like vary depending on the distribution. That is, it may have been difficult for the measurement light to enter into the measurement target 10 at a uniform Brewster angle.

Figure 3:
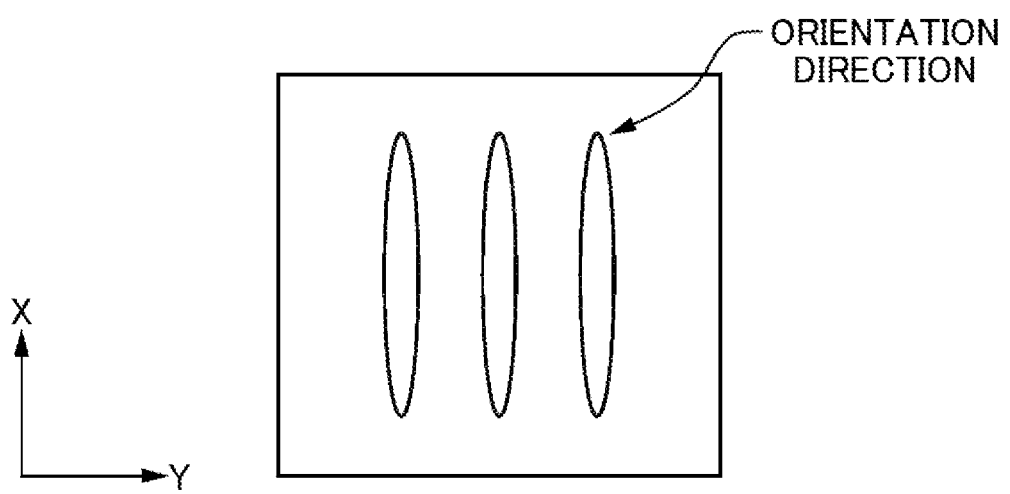
FIG. 3 shows a first example for an orientation direction of the measurement target 10 according to the present embodiment.

FIG. 3 shows a first example of the orientation direction of the measurement target 10 according to the present embodiment. In the example shown, the orientation direction of the first example is approximately parallel to the x direction. For example, the orientation angle of the measurement target 10 shown in FIG. 3 is assumed to be zero degree.

Figure 4:
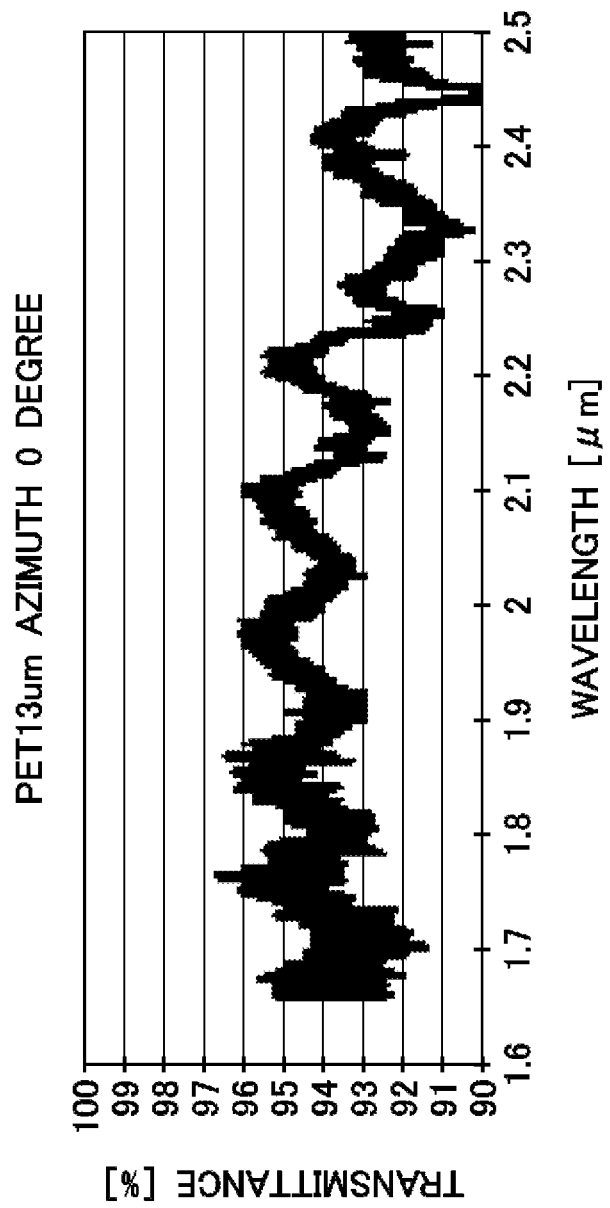
FIG. 4 shows one example for the transmission property of the measurement target 10 shown in FIG. 3.

FIG. 4 shows one example of the transmission property of the measurement target 10 shown in FIG. 3. The horizontal axis in FIG. 4 shows the wavelength (1.67-2.50 µm) of light entering to the measurement target 10 and the vertical axis shows the transmittance (%). It is noted that the light entering into the measurement target 10 is P polarized light. FIG. 4 shows an example of the measurement result for the transmission property obtained by using FTIR (fourier transform infrared spectroscopy).

Figure 5:
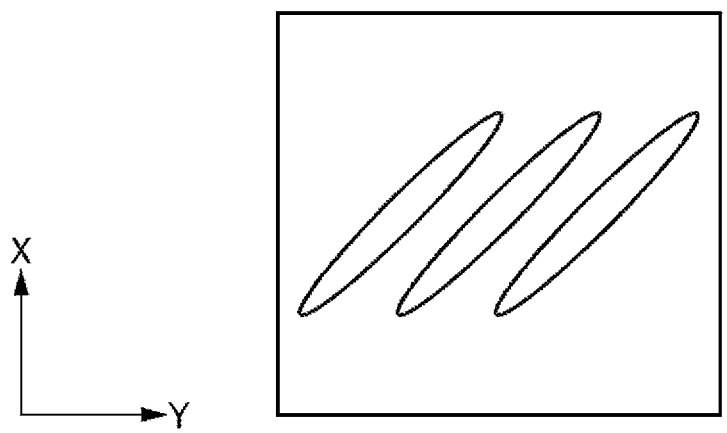
FIG. 5 shows a second example for the orientation direction of the measurement target 10 according to the present embodiment.

FIG. 5 shows a second example of the orientation direction for the measurement target 10 according to the present embodiment. The orientation direction of second example shows an example in which the orientation direction of the measurement target 10 shown in FIG. 3 is turned approximately 45 degrees. For example, the orientation angle of the measurement target 10 shown in FIG. 5 is assumed to be 45 degrees.

Figure 6:
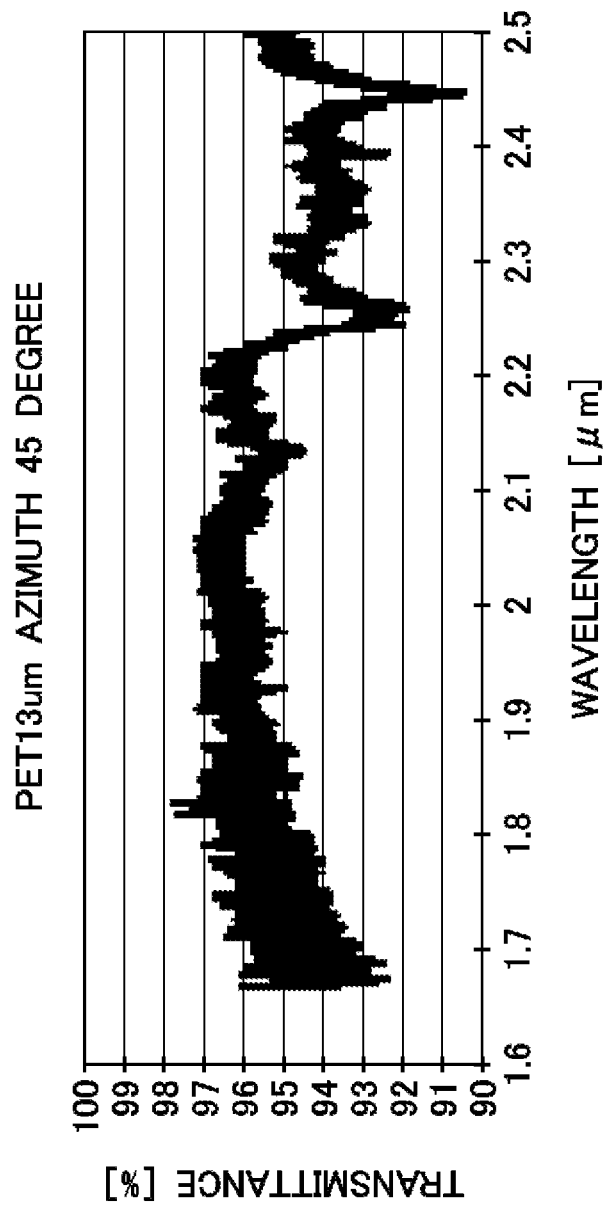
FIG. 6 shows one example for the transmission property of the measurement target 10 shown in FIG. 5.

FIG. 6 shows one example of the transmission property for the measurement target 10 shown in FIG. 5. As with FIG. 4, the horizontal axis in FIG. 6 shows wavelength (1.67-2.50 µm) of light entering to the measurement target 10 and the vertical axis shows the transmittance (%). It is noted that the light entering into the measurement target 10 is P polarized light. As with FIG. 4, FIG. 6 shows an example of the measurement result for the transmission property obtained by using FTIR (fourier transform infrared spectroscopy).

FIG. 4 and FIG. 6 are examples in which the light enters into the measurement target 10 at Brewster angle. By comparing FIG. 4 and FIG. 6, it can be learned that the state of occurrence and inhibition of interference varies depending on turning of the measurement target 10. In this way, it can be learned that the degree of interference of the measurement target 10 changes depending on the orientation angle of the measurement target 10.

Figure 7:
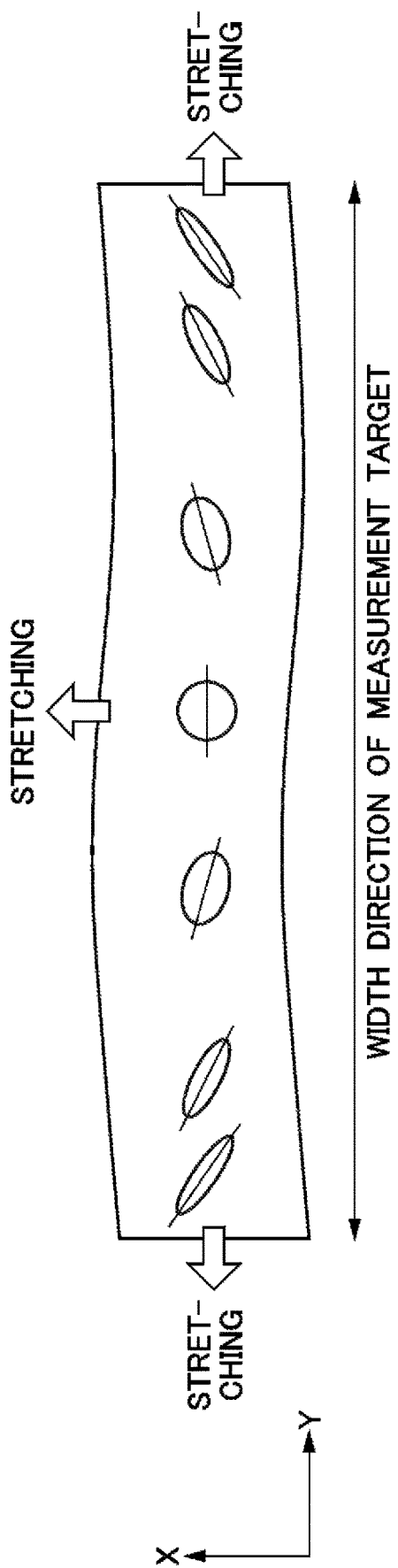
FIG. 7 shows one example for a distribution of the orientation direction of the measurement target 10 according to the present embodiment.

FIG. 7 shows one example of the orientation direction distribution of the measurement target 10 according to the present embodiment. FIG. 7 shows one example of the schematic view of the indicatrix in the plane in the width direction (y direction) of the measurement target 10, which has undergone the biaxial stretching. The biaxial stretching may cause the measurement target 10 to be stretched with different forces and in different directions in single width direction, resulting in different orientation angles. In this case, for example, even if the measurement light enters at the same incidence angle across the width direction, the interference appears in different manners according to positions in the width direction of the measurement target 10. In this way, when a bowing phenomenon occurs, optical properties may tend to change as shown in FIG. 4 and FIG. 6.

The above example describes one example of the measurement results of the measurement target 10 with birefringence. However, the measurement result may also similarly exhibit an unnatural behavior when scattered light occurs on the front surface and/or the back surface of the measurement target 10. That is, the reflected light form the front surface and/or the back surface of the measurement target 10 may significantly vary due to interference. Accordingly, even if a physical quantity is calculated by using the reflected light intensity ($I_{REF}$) as in, for example, Equation 1 and Equation 2, there may be an error from the actual physical quantity.

For example, since the reflected light intensity ($I_{REF}$) may vary approximately several percent due to interference, it may be challenging to measure the transmitted light intensity and the like with an error of approximately 0.1%. Accordingly, the measurement device 100 according to the present embodiment inhibits the occurrence of such an interference by using an integrating sphere to emit measurement light to the measurement target 10. Then, the measurement device 100 precisely measures the physical quantity of the measurement target 10 based on the detection result of transmitted light intensity $I_{TR}$ while inhibiting the interference. A measuring head 120 of the measurement device 100 will be described in the following.

Figure 8:
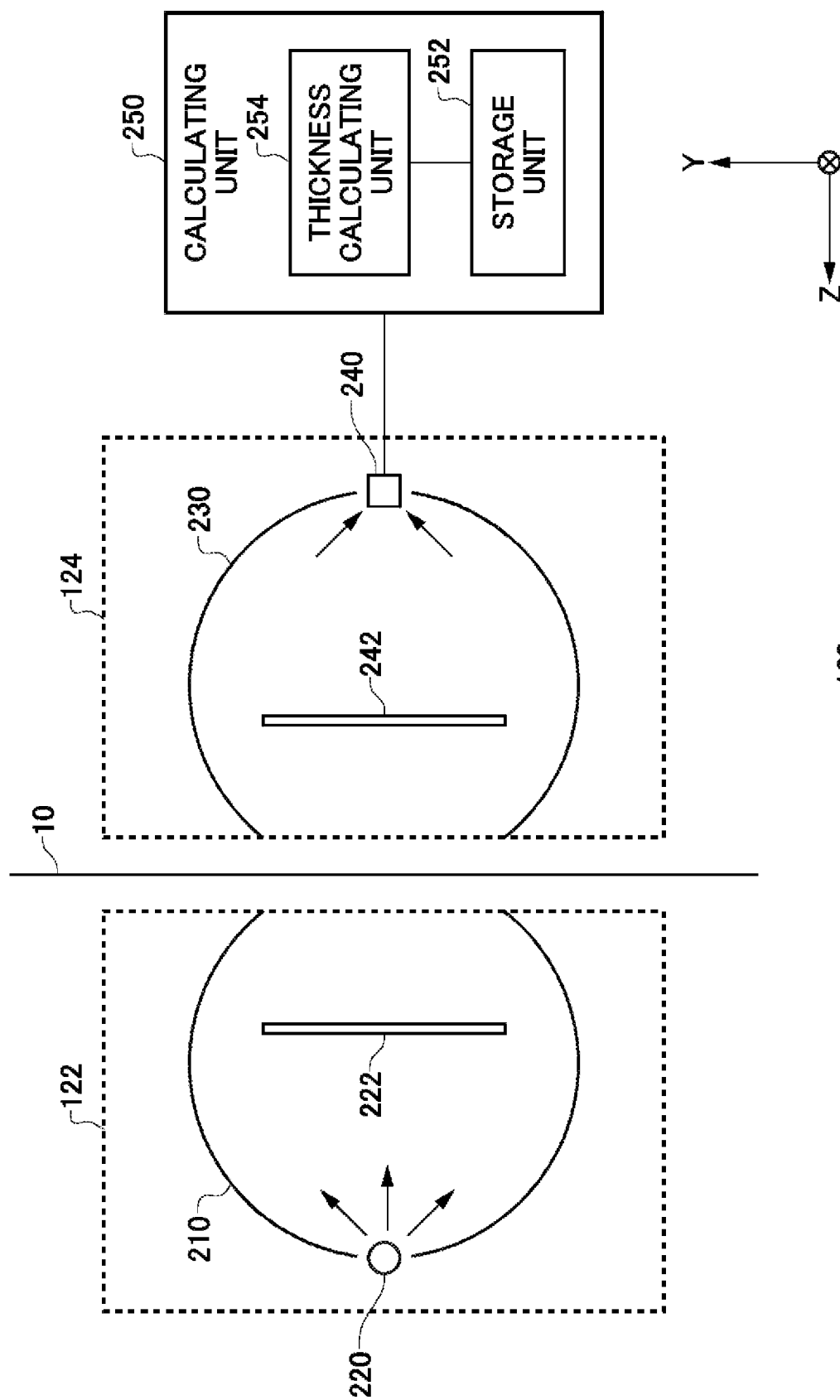
FIG. 8 shows a configuration example for the measuring head 120 according to the present embodiment along with the measurement target 10.

FIG. 8 shows the configuration example of the measuring head 120 according to the present embodiment along with the measurement target 10. The measuring head 120 includes the first head 122 and the second head 124 as described in FIG. 1. Additionally, the measurement target 10 is placed between the first head 122 and the second head 124. The measuring head 120 includes a first integrating sphere 210, a light source unit 220, a shielding plate 222, a second integrating sphere 230, a light detecting unit 240, and a shielding plate 242. The measurement device 100 also further includes a calculating unit 250.

The first integrating sphere 210 is separated by a gap from the first surface of the measurement target 10. The first integrating sphere 210 is preferably placed at a position where it does not contact the measurement target 10. The first integrating sphere 210 includes a first opening facing the first surface. The first integrating sphere 210 has a shape such that a part of a sphere is cut off by a plane, and the cut-off surface may be formed as a first opening. The first opening of the first integrating sphere 210 may have a circular shape. Additionally, the first opening of the first integrating sphere 210 may be located between the spherical center of the first integrating sphere 210 and the first surface. That is, the contour shape of the first integrating sphere 210 may have a larger surface area and be more similar to a spherical shape than the corresponding hemisphere.

The inner wall of the first integrating sphere 210 reflects the input light and outputs it from the opening toward the measurement target 10. A surface with a high reflectivity and a high diffusibility is suitable for the inner wall of the first integrating sphere 210. For example, a surface formed by gilding a roughened surface or a surface formed by coating a roughened rough surface with material having a high reflectivity and a high diffusibility, such as barium carbonate, is suitable. The first integrating sphere 210 is not provided with a light detector which detects an intensity of light used for calculation of physical quantities. That is, the first integrating sphere 210 is not provided with a light detector which measures the reflected light from the measurement target 10. It is noted that the first integrating sphere 210 may be provided with a light detector which detects the intensity of light other than the reflected light, for example, such as measurement light. Even if the first integrating sphere 210 is provided with a light detector and the reflected light is detected, the result may not be used for calculation of the physical quantities of the measurement target 10.

The light source unit 220 emits light into the first integrating sphere 210. The light source unit 220 emits light, which is to be emitted to the measurement target 10 as the measurement light, into the first integrating sphere 210. The light source unit 220 may be provided inside the first integrating sphere 210, or alternatively, may be provided outside the first integrating sphere 210. If the light source unit 220 is provided outside the first integrating sphere 210, it may emit the light from an opening other than the first opening of the first integrating sphere 210. The light source unit 220 emits, for example, infrared light. The light source unit 220 may emits light with one or more wavelengths.

The shielding plate 222 shields a part of the light emitted by the light source unit 220. The shielding plate 222 prevents light emitted by the light source unit 220 from directly reaching the measurement target 10 without being reflected on the inner wall of the first integrating sphere 210. That is, light emitted by the light source unit 220 reflects one or more times on the inner wall of the first integrating sphere 210 before being emitted to the measurement target 10. In this way, the first head 122 can emit the measurement light to the measurement target 10 at various incidence angles. The incident angle to the measurement target 10 can be larger than zero degree. This increases the amount of light absorbed by the measurement target 10 to improve the measurement precision of the measurement target 10 with a thin thickness. It is noted that the zero degree refers to the incident angle of the light entering approximately perpendicularly to the first surface of the measurement target 10.

Here, the interference occurs, for example, in the following mechanism: when the optical path difference between the light reflected on the front surface of the measurement target 10 and the light reflected on the back surface is m times larger than the wavelength of the measurement light, the waves combine to create a stronger wave, whereas when the difference is (m+½) times larger, the waves combine to creates a weaker wave, wherein m=0, 1, 2, . . . . Here, when the first head 122 emits the measurement light at various incidence angles, the optical path differences between the light reflected on the front surface and the back surface of the measurement target 10 will be various values, instead of a constant value. Due to such various optical path differences, the constructive interferences and the destructive interferences are mixed to be averaged, resulting in the reduced influence of the interference of the entire reflected light.

Accordingly, the influence of interference can be inhibited by using the first head 122, even if the measurement target 10 is birefringent, or has reflected light on the front surface and/or the back surface. Additionally, the first head 122 can efficiently emit the measurement light to the measurement target 10 by reusing the reflected light due to the multiple reflection of the first integrating sphere 210.

A second integrating sphere 230 is separated by a gap from the second surface, which is positioned opposite to the first surface of the measurement target 10. The second integrating sphere 230 is preferably placed at a position where it does not contact the measurement target 10. That is, the first integrating sphere 210 and the second integrating sphere 230 are provided at positions separated by a predetermined distance and the measurement target 10 is placed in the gap between the first integrating sphere 210 and the second integrating sphere 230. The moving unit moves such first integrating sphere 210 and second integrating sphere 230 relative to the measurement target 10 in the plane direction.

The second integrating sphere 230 has a second opening which faces the first opening with the measurement target 10 sandwiched therebetween. The second integrating sphere 230 has a shape such that a part of a sphere is cut off by a plane, and the cut-off surface may be formed as a second opening. The second opening of the second integrating sphere 230 may have a circular shape. Additionally, the second opening of the second integrating sphere 230 may be located between the spherical center of the second integrating sphere 230 and the second surface. That is, the contour shape of the second integrating sphere 230 may have a larger surface area and be more similar to a spherical shape than the corresponding hemisphere.

The shape of the second integrating sphere 230 may be similar to the shape of the first integrating sphere 210. The shape of the second integrating sphere 230 may be approximately identical to, or alternatively, different from, the shape of the first integrating sphere 210. For example, the second opening of the second integrating sphere 230 may be formed such that it is larger than the first opening of the first integrating sphere 210. The inner wall of the second integrating sphere 230 reflects the input light to emit to the light detecting unit 240. A surface with a high reflectivity and a high diffusibility is suitable for the inner wall of the second integrating sphere 230. For example, a surface formed by gilding a roughened rough surface or a surface formed by coating a roughened rough surface with material having a high reflectivity and a high diffusibility, such as barium carbonate, is suitable.

The light detecting unit 240 detects the intensity of light inside the second integrating sphere 230. The light detecting unit 240 may be provided inside the second integrating sphere 230, or alternatively, may be provided outside the second integrating sphere 230. If the light detecting unit 240 is provided outside the second integrating sphere 230, it may receive the light from the opening other than the second opening of the second integrating sphere 230. The light detecting unit 240 may be a sensor, such as a photodiode, which detects electromagnetic energy of light and the like.

The shielding plate 242 reflects at least a part of the light which is reflected inside the second integrating sphere 230 to be leaked outside otherwise, and transferred it back into the second integrating sphere 230. The intensity of light received by the light detecting unit 240 may vary depending on the relative position between the second integrating sphere 230 which reflects light and the measurement target 10. For example, light which is reflected inside the second integrating sphere 230 to be output outside the second integrating sphere 230 without being detected by the light detecting unit 240 varies depending on the relative position (such as a gap, the tilting of the measurement target 10, and the surface condition of the measurement target 10 such as creases) between the second integrating sphere 230 and the measurement target 10. Accordingly, the shielding plate 242 transfers such light back into the second integrating sphere 230 to reduce the variation of the amount of light received by the light detecting unit 240.

The surface of the shielding plate 242 facing the measurement target 10 reflects, to the measurement target 10, the light which enters into the second integrating sphere 230 from the measurement target 10. For example, such reflected light from the shielding plate 242 transmits through the measurement target 10, goes back to the first integrating sphere 210, is reflected on the first integrating sphere 210 and/or the shielding plate 222, transmits through the measurement target 10, and then enters into the second integrating sphere 230 again. In this case, because the light which enters into the second integrating sphere 230 again has transmitted through the measurement target 10 three times, the amount absorbed by the measurement target 10 can be increased. That is, the shielding plate 222 and/or the shielding plate 242 allows the measurement light to be reused several times among the first integrating sphere 210 and the second integrating sphere 230, and can increase the amount of the measurement light absorbed by the measurement target 10 depending on the number of reuses. Accordingly, the measurement device 100 can precisely measure the measurement target 10, even if the measurement target 10 is thin film with a thickness of approximately several micrometers.

It is noted that the size and position of the shielding plate 242 may be designed such that they correspond to the size and position of the shielding plate 222. For example, if the distance between the shielding plate 242 and the measurement target 10 is approximately identical to the distance between the shielding plate 222 and the measurement target 10, the length in the x direction and the y direction of the shielding plate 242 may be approximately identical to or smaller than the length in the x direction and the y direction of the shielding plate 222.

The calculating unit 250 calculates the physical quantities of the measurement target 10 based on the intensity of light detected by the light detecting unit 240. The calculating unit 250 calculates the physical quantities of the measurement target 10 by, for example, using the relationship between the known intensity of measurement light and the intensity of the light detected by the light detecting unit 240. In the present embodiment, the physical quantity calculated by the calculating unit 250 is the thickness of the measurement target 10. In this case, the calculating unit 250 includes a storage unit 252 and a thickness calculating unit 254.

The storage unit 252 stores the light intensity which is detected while a reference object with a known thickness is placed between the first opening and the second opening, and the thickness of the reference object. It is noted that the light intensity to be stored in the storage unit 252 is preferably the light intensity which is detected when measurement light with a predetermined light intensity is emitted to the reference object. For example, the storage unit 252 associates such a light intensity and the thickness of reference object and stores the combination therebetween. The storage unit 252 preferably associates and stores each of the light intensities detected for a plurality of reference objects with different thickness and the thickness of the reference object. The storage unit 252 may store the combination between the thickness of a plurality of reference objects and the light intensity in a table form.

The thickness calculating unit 254 calculates the thickness of the measurement target 10 based on the light intensity detected while the measurement target 10 is placed between the first opening and the second opening, and the light intensity and the thickness for the reference object stored in the storage unit 252. The thickness calculating unit 254 calculates the relational expression for the thickness relative to the light intensity, for example, based on the combination between the thickness of a plurality of reference objects and the light intensity. The thickness calculating unit 254 may calculate the relational expression by a regression analysis such as a least squares method. The thickness calculating unit 254 then calculates the thickness of the measurement target 10 by substituting, for the function, the light intensity detected when the measurement target 10 is placed. It is noted that the storage unit 252 may store the relational expression calculated by the thickness calculating unit 254.

In the example described above, the calculating unit 250 directly calculates the thickness of the measurement target 10, which should not be considered as a limitation. For example, the calculating unit 250 may first calculate the grammage of the measurement target 10 and then convert it to the thickness. In this case, the storage unit 252 may store the grammage of the reference object.

As described above, the calculating unit 250 calculates the thickness of the measurement target 10 by using a known physical quantity of the reference object and an intensity of the transmitted light through the measurement target 10. Accordingly, the measurement device 100 can calculate physical quantities of the measurement target 10 without using the intensity of reflected light. That is, the measurement device 100 can precisely measure the physical quantities of the measurement target 10, even if the reflected light intensity varies due to the occurrence of interference and the like.

The measurement device 100, which uses the integrating sphere to emit the measurement light to the measurement target 10 and uses the integrating sphere to detect the transmitted light, can precisely conduct measurement with the optical adjustment which can be made more easily than the measurement device which conducts measurement using an incidence angle of Brewster angle. Also, it can be easily applied to a measurement having a real-time property such as an online measurement, because the influence due to the misalignment of the optical axis and the like is small, even if the relative position of the first head 122 and the second head 124 varies (alignment variation).

Additionally, in such an online measurement, because the relative position of the measuring head 120 and the measurement target 10 varies during measurement, the position of the measurement target 10 may swing toward the first integrating sphere 210 or the second integrating sphere 230 (that is, in the z direction) in the gap between the first integrating sphere 210 and the second integrating sphere 230 (pass line variation). Even if such a variation of positions of the measurement target 10 occurs, the measurement device 100 can use the integrating sphere to reduce the variation of the light intensity received by the light detecting unit 240 to output an stable measurement result. Additionally, because a detector to detect the reflected light does not need to be provided at the first integrating sphere 210, from which the measurement light is emitted, the cost can be reduced the spatial degrees of freedom can be improved.

In the example described above, the measurement device 100 according to the above-described present embodiment measures the thickness of the measurement target 10 based on the transmitted light of the measurement light, i. e. the absorption amount of the measurement light, which varies depending on the thickness of the measurement target 10. In this case, the measurement target 10 has a specific absorption spectrum corresponding to the material included in the measurement target 10. If the measurement target 10 includes material such as paper and resin (PET and the like), it often has a specific absorption spectrum in the infrared wavelength band. Accordingly, the light source unit 220 can preferably emit the light in the infrared band.

Figure 9:
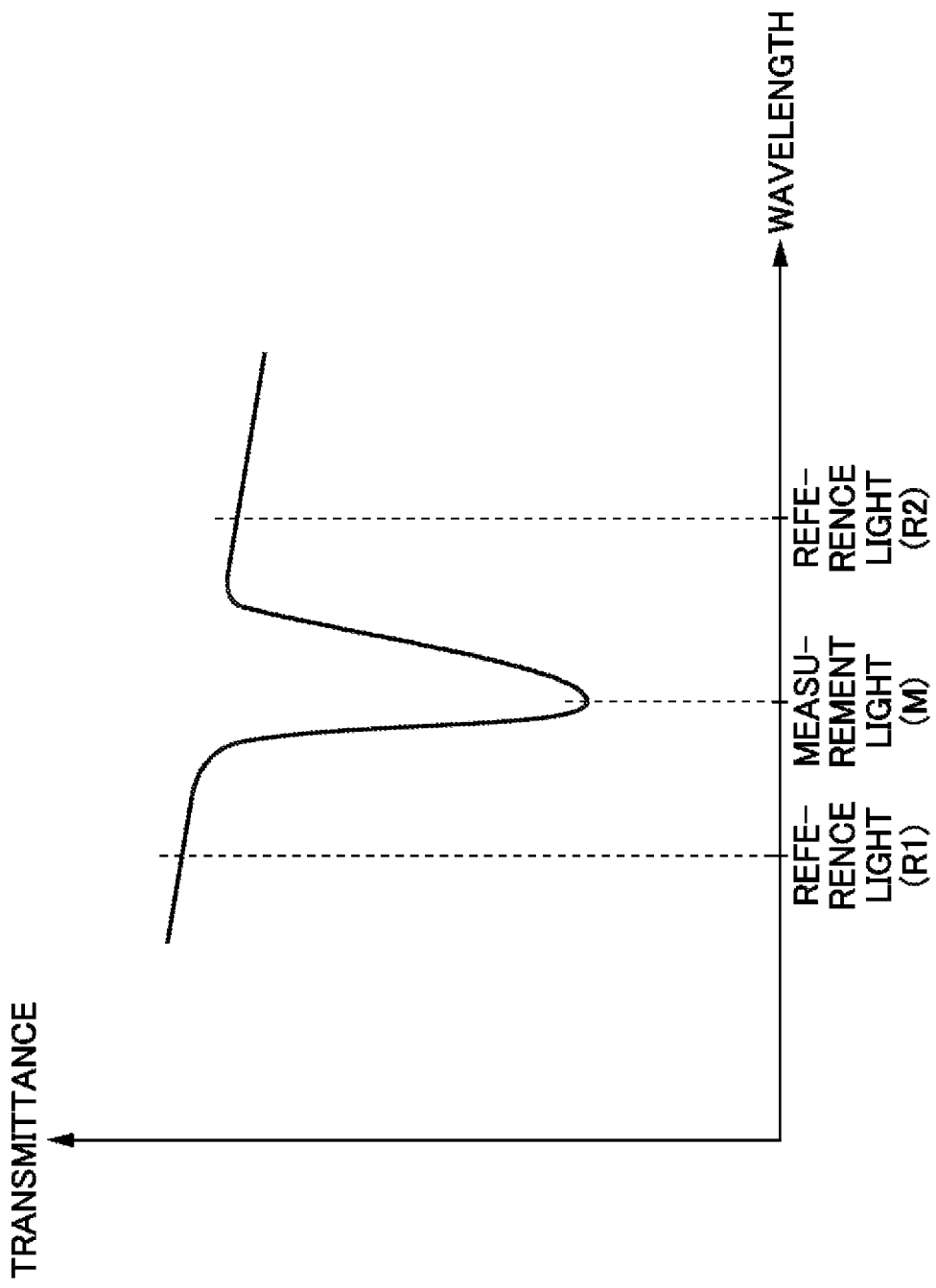
FIG. 9 shows one example for an absorption spectrum of the measurement target 10 according to the present embodiment.

FIG. 9 shows one example of the absorption spectrum of the measurement target 10 according to the present embodiment. The horizontal axis in the FIG. 9 shows the wavelength, and the vertical axis shows the transmittance. In FIG. 9, the wavelength associated with the low transmittance indicates that light having that wavelength is largely absorbed by the measurement target 10. The measurement device 100 according to the present embodiment measures the thickness of the measurement target 10 based on the amount of the measurement light absorbed by the measurement target 10, as shown in FIG. 9. Accordingly, the wavelength of the measurement light emitted by the light source unit 220 is preferably the wavelength where the measurement target 10 exhibits the lowest transmittance.

It is noted that, in the measurement device 100, the light intensity detected by the light detecting unit 240 may vary, irrelevant to the thickness of the measurement target 10, due to the haze (turbidity) in the measurement target 10 against the measurement light, the change in reflectance on the surface, disturbance, and the like. Accordingly, the light source unit 220 may emit reference light with a different wavelength from the measurement light. In this case, the light source unit 220 preferably emits reference light with a wavelength other than the wavelength band where the amount of light absorbed by the measurement target 10 is larger. FIG. 9 shows an example in which the light source unit 220 emits first reference light R1 with a wavelength shorter than that of the measurement light M and second reference light R2 with a wavelength longer than that of the measurement light M.

The first reference light R1 and the second reference light R2 are less absorbed by the measurement target 10 than the measurement light M. That is, if there is variation in light intensity when the light detecting unit 240 performs detection for the first reference light R1 and the second reference light R2, the most of the causes of the variation can be assumed to be irrelevant to the thickness of the measurement target 10. Accordingly, the variation in the light intensity that is not attributable to the thickness of the measurement target 10 can be reduced by comparing the result of detecting the transmitted light when the measurement target 10 is irradiated with the first reference light R1 and the second reference light R2 and with the measurement light M.

Such an approach to precisely measure the variation of light intensity by emitting light with three wavelengths to the measurement target 10 is known as three wavelength measurement technique. In the three wavelength measurement technique, the relationship between the measurement light and the reference light is expressed in the following equation:

$$I_0 = M/(a_1 * R1 + a_2 * R2)$$

$$a_1 + a_2 = 1 \quad \text{(Equation 3)}$$

wherein M is the intensity of measurement light, R1 and R2 is respectively the intensity of the first reference light and the second reference light.

Here, $I_0$ indicates the ratio of the measurement light intensity to the reference light intensity prior to entering into the measurement target 10. As with Equation 2, the following equation holds true:

$$I = I_0 * \exp(-\alpha t) \quad \text{(Equation 4)}$$

wherein t is the thickness of the measurement target 10 and $\alpha$ is the light absorption coefficient.

Here, I indicates the ratio of the measurement light intensity to the reference light intensity after transmitting through the measurement target 10. In this way, the variation in the light intensity irrelevant to the thickness of the measurement target 10 can be offset and reduced by comparing the detection result of the transmitted light through the reference object and the measurement target 10 in the form of Equation 4 including the measurement light and the reference light. The above-mentioned light source unit 220 which performs the three wavelength measurement technique is described in the followings.

Figure 10:
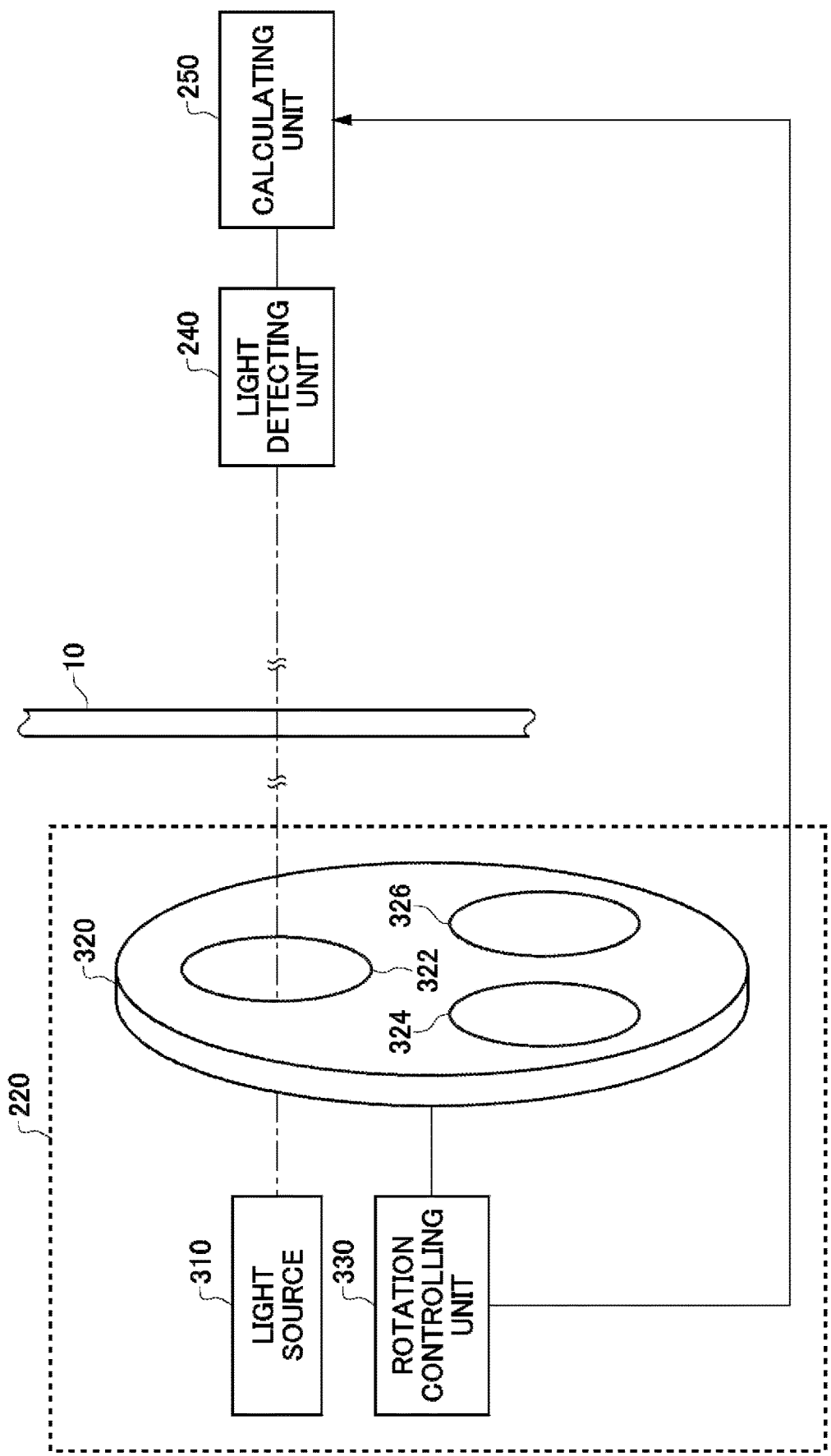
FIG. 10 shows a configuration example of the light source unit 220 according to the present embodiment.

FIG. 10 shows a configuration example of the light source unit 220 according to the present embodiment. In the example shown, the light source unit 220 as shown in FIG. 10 uses a light filter to separate the measurement light and the reference light for emission from the light source whose emission band is the wavelength band including the wavelengths of the measurement light and the reference light. The light source unit 220 includes a light source 310, a filter unit 320, and a rotation controlling unit 330.

The light source 310 emits light with a wavelength band including the wavelength of the measurement light and the reference light. The light source 310 may be a light source with the emission band in the infrared band, such as a halogen lamp and a LED.

The filter unit 320 includes a plurality of filters, each of which corresponds to the measurement light and the reference light. The plurality of filters may be light band pass filters through which light with a predetermined wavelength passes. The filter unit 320 is formed as a disk-like shape and includes a plurality of through hole in which the plurality of filters is provided. The filter unit 320 includes a first filter 322, for example, through which the measurement light passes. The filter unit 320 also includes a second filter 324, through which the first reference light passes, and a third filter 326, through which the second reference light passes.

The rotation controlling unit 330 controls the arrangement of the plurality of filters by rotating the filter unit 320. The rotation controlling unit 330 rotates the filter unit 320 such that the filter among the plurality of filters which corresponds to the light to be emitted by the light source unit 220 faces the light source 310. For example, when the light source unit 220 emits the measurement light, the rotation controlling unit 330 causes the first filter 322 to face the light source 310, separates the light with the wavelength of the measurement light from the spectrum of light output by the light source 310 and outputs the light outside the light source unit 220.

In this way, because the light filter can emit light by separating the light with the wavelength for emission from the emission band of the light source 310, the light source unit 220 which emits a plurality of rays of light with different wavelengths can be made with low cost. In the example described above, the above-mentioned light source unit 220 can individually emit light with three wavelengths, which should not be considered as a limitation. The light source unit 220 may be a light source which emits light with one wavelength, two wavelengths, or four or more wavelengths. The light source unit 220 can emit light with one or more wavelengths by providing, in a filter unit, a light filter corresponding to the wavelength to be emitted.

In an example described in reference to FIG. 10, the light source 310 may be a lamp, LED, or the like, which should not be considered as a limitation. The light source 310 may include one or more laser and the like which output light with a predetermined wavelength. The light source 310 may include a light source with a variable wavelength. In this case, the light source unit 220 may include, instead of the rotation controlling unit 330, a controlling unit which directly controls the wavelength output from the light source 310.

It is noted that the light source unit 220 as shown in FIG. 10 can modulate the light intensity of the measurement light and the reference light by using the rotation controlling unit 330 to rotate the filter unit 320. That is, the light source unit 220 can emit light into the first integrating sphere 210 by modulating, with a modulation frequency, the reference light and the measurement light with optical wavelengths different from each other.

In this case, the light detecting unit 240 receives the modulated light which has transmitted through the measurement target 10. The calculating unit 250 then demodulates the light intensity of the modulated light detected by the light detecting unit to calculate each of the light intensities of the reference light and the measurement light. The calculating unit 250 may receive the information on the modulation frequency from the light source unit 220 for demodulation. Thus, the measurement device 100 can perform synchronous detection for the reference light and the measurement light, and can precisely measure physical quantities by reducing the influence of noise and the like.

It is noted that, in the example shown, the filter unit 320 shown in FIG. 10 includes one first filter 322, one second filter 324, and one third filter 326. In this case, the rotational number per second k of the filter unit 320 corresponds to the modulation frequency k of the reference light and the measurement light.

Accordingly, the filter unit 320 may include two or more first filters 322, two or more second filters 324, and two or more third filters 326. For example, the filter unit 320 may include n filters for each filter type. In this case, n first filters 322, n second filters 324, and n third filters 326 are each arranged at equal intervals in the circumferential direction. The filter unit 320 is, for example, divided into 3*n pieces in the circumferential direction, where the first filters 322, the second filters 324, and the third filter 326 are arranged sequentially.

In this way, for the rotational number per second k of the filter unit 320, the modulation frequency for the reference light and the measurement light can be n*k, which is n times higher. That is, the measurement device 100 can easily achieve a modulation with a higher frequency.

The filter unit 320 may also include the first filter 322, the second filter 324, and the third filter 326, the number of which are different from each other. The filter unit 320 may include, for example, n first filters 322, m second filters 324, and l third filters 326. The filter unit 320 may, for example, be divided into three parts in the radial direction to form three ring-shaped regions, and then the first ring region may be divided into n parts in the circumferential direction, the second ring region may be divided into m parts in the circumferential direction, and the third ring region may be divided into l parts in the circumferential direction.

Thus, the n first filters 322, the m second filters 324, and the l third filter 326 can be placed in the first ring regions, the second ring regions, and the third ring regions, respectively, at the equal intervals in the circumferential direction. In this way, when the rotational number per second of the filter unit 320 is k, the modulation frequency of the reference light and the two rays of measurement light can be n*k, m*k, and l*k, respectively, which are frequencies different from each other. That is, the light source unit 220 can emit, into the first integrating sphere 210, the combined light which is formed by modulating, with modulation frequencies different from each other, the reference light and the measurement light having optical wavelengths different from each other.

The light received by the light detecting unit 240 is part of the combined light that has transmitted through the measurement target 10, where the combined light is obtained by combining the reference light and the measurement light modulated with different frequencies. In this case, the calculating unit 250 calculates each of the light intensities of the reference light and the measurement light by demodulating the light intensity of the combined light detected by the light detecting unit 240. The thickness calculating unit 254 then calculates the physical quantities of the measurement target 10 based on the attenuation amount of the measurement light relative to that of the reference light.

It is noted that the calculating unit 250 uses different frequencies to demodulate the measurement light and the two rays of reference light. For example, the calculating unit 250 can calculate the light intensity of the measurement light by demodulating the combined light with the frequency n*k. The calculating unit 250 can also calculate the light intensity of the first reference light by demodulating the combined light with the frequency m*k. The calculating unit 250 can calculate the light intensity of the second reference light by demodulating the combined light with the frequency l*k.

In this way, because the measurement device 100 can calculate the light intensities of the three rays of light based on the detection result of the approximately identical combined light, it can improve the real-time property. That is, the moving unit can continuously perform the measurement of physical quantities by continuously moving the first integrating sphere 210 and the second integrating sphere 230 relative to the measurement target 10 while the light detecting unit 240 is detecting the intensity of light used for calculation of the physical quantities of the measurement target 10.

In addition to being able to calculate the light intensities of the three rays of light based on the approximately identical combined light, the immunity against external noise can be significantly improved. For example, when the measurement target 10 is resin sheet or paper which is continuously produced, it is continuously carried in a high temperature state. In this case, the measurement target 10 emits near infrared light with wavelength approximately identical to the light used for measuring the measurement light, the reference light, and the like, which may be superimposed as a noise component. A signal which is too weak to be separated from such a noise component cannot be used for calculation, resulting in a less precise measurement. Accordingly, the light intensity of a light source must be strong enough not to be influenced by the environment. However, for example, when the measurement device 100 is a portable apparatus, there is an upper limit due to the size of the installed measuring head, exhaust heat, and the like.

To capture such a weak signal and conduct a precise calculation, the improvement of the S/N, such as the improvement of signal component (S) or the decrease of the noise component, may be required. Accordingly, in order to improve such S/N, the measurement device 100 may use a lock-in amplifier to extract in-phase components and/or quadrature components of the modulated signal. For example, the calculating unit 250 includes and uses a lock-in amplifier to demodulate the light intensity of the combined light detected by the light detecting unit 240 to calculate each of the light intensities of the reference light and the measurement light. In this way, the measurement device 100 can precisely calculate weak signals.

It has been described that, the above-described measurement device 100 according to the present embodiment has the measurement target 10 placed between the two integrating spheres which are separated by a predetermined distance, enabling a non-contact measurement of the physical quantities of the measurement target 10. The measurement device 100 may be configured to be able to prevent the measuring head 120 from contacting the measurement target 10. The measuring head 120 will be described in the followings.

Figure 11:
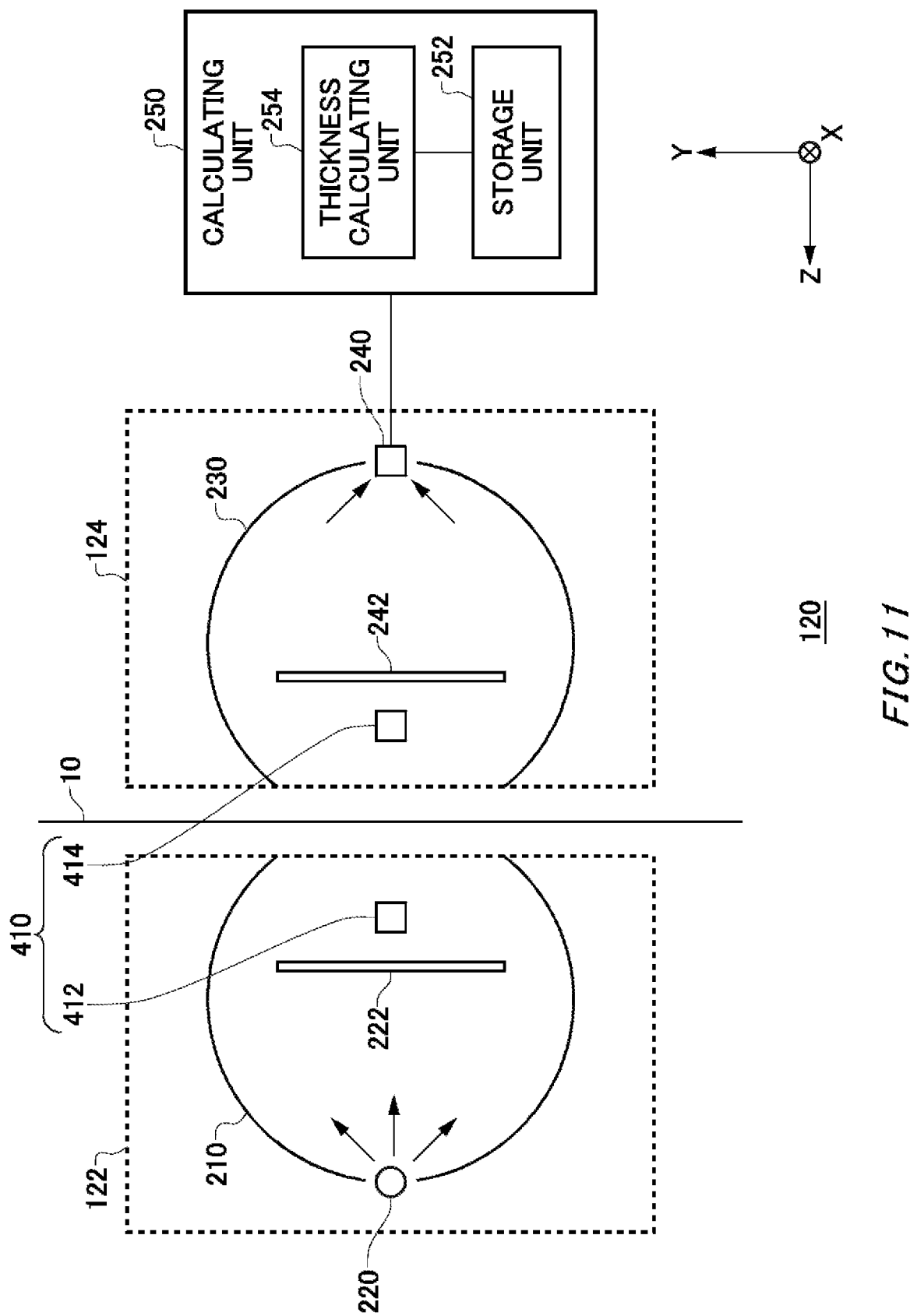
FIG. 11 shows a variant example of the measuring head 120 according to the present embodiment.

FIG. 11 shows a variant example of the measuring head 120 according to the present embodiment. In the measuring head 120 in the present variant example, a component which operates in the way approximately identical to that of the measuring head 120 according to the present embodiment shown in FIG. 8 has the same label, and the details are not described again. The measuring head 120 in the present variant example further includes a gap-controlling unit 410.

The gap-controlling unit 410 maintains the gap between the first opening and the measurement target 10, and the gap between the second opening and the measurement target 10. The gap-controlling unit 410 includes a first controlling unit 412 provided on the first head 122 and the second controlling unit 414 provided on the second head 124. The gap-controlling unit 410 may maintain each gap by using air pressure. The gap-controlling unit 410 may be provided inside the integrating sphere, or alternatively, may be provided outside the integrating sphere. FIG. 11 shows an example in which the first controlling unit 412 is provided inside the first integrating sphere 210, and the second controlling unit 414 is provided inside the second integrating sphere 230.

In this case, the first controlling unit 412 may increase the air pressure inside the first integrating sphere 210 above the outside air pressure, and the second controlling unit 414 may increase the air pressure inside the second integrating sphere 230 above the outside air pressure. Alternatively, the first controlling unit 412 may decrease the air pressure inside the first integrating sphere 210 below the outside air pressure, and the second controlling unit 414 may decrease the air pressure inside the second integrating sphere 230 below the outside air pressure. The gap-controlling unit 410 stabilizes the position of the measurement target 10 in the z direction by making the air pressure inside the first integrating sphere 210 and the second integrating sphere 230 approximately identical so that the first surface and the second surface of the measurement target 10 are pressed or pulled with the approximately identical force.

The gap-controlling unit 410 may also include a guide and the like which physically contact the measurement target 10, if the measurement target 10 is made of material which allows contact. The gap-controlling unit 410 may also include a distance sensor to detect the distance from the measurement target 10, in order to prevent the measurement target 10 from contacting the measuring head 120 due to a malfunction of the moving unit and the like.

That is, the first controlling unit 412 measures the gap between the first integrating sphere 210 and the measurement target 10. The second controlling unit 414 also measures the gap between the second integrating sphere 230 and the measurement target 10. The first controlling unit 412 and the second controlling unit 414 send a notification to the moving unit for stopping the movement of the measurement target 10, for example, if they detect a malfunction. In this way, the measurement device 100 can detect the malfunction and the like of the moving unit while preventing the measuring head 120 from contacting the measurement target 10.

Various embodiments of the present invention described above may be described with reference to flow charts and block diagrams. The blocks in the flow charts and block diagrams may be represented as (1) steps of processes in which operations are performed or (2) "sections" of apparatuses responsible for performing operations. Certain steps and "sections" may be implemented by dedicated circuit, programmable circuit supplied with computer-readable instructions stored on computer-readable storage media, and/or processors supplied with computer-readable instructions stored on computer-readable storage media.

Note that dedicated circuit may include digital and/or analog hardware circuits and may include integrated circuits (IC) and/or discrete circuits. Programmable circuit may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc., for example.

Computer-readable storage media may include any tangible device that can store instructions for execution by a suitable device. Accordingly, the computer-readable storage medium having instructions stored in the tangible device comprises an article of manufacture including instructions which can be executed to create means for performing operations specified in the flow charts or block diagrams.

Examples of computer-readable storage media may include an electronic storage medium, a magnetic storage medium, an optical storage medium, an electromagnetic storage medium, a semiconductor storage medium, etc. More specific examples of computer-readable storage media may include a floppy disc (registered mark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered mark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data etc. Also the computer-readable instructions may include source code or object code written in any combination of one or more programming languages, including an object oriented programming language such as Smalltalk, JAVA (registered mark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuit, locally or via a local area network (LAN), wide area network (WAN) such as the Internet, etc. Accordingly, a processor of a general purpose computer, special purpose computer, or other programmable data processing apparatus, or a programmable circuit can execute the computer-readable instructions to create means for performing operations specified in the flow charts or block diagrams. Note that, examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

10 . . . measurement target, 12 . . . measurement line; 100 . . . measurement device; 110 . . . frame; 120 . . . measuring head; 122 . . . first head; 124 . . . second head; 130 . . . head-moving unit; 132 . . . first head-moving unit; 134 . . . second head-moving unit; 140 . . . target-moving unit; 210 . . . first integrating sphere; 220 . . . light source unit; 222 . . . shielding plate; 230 . . . second integrating sphere; 240 . . . light detecting unit; 242 . . . shielding plate; 250 . . . calculating unit; 252 . . . storage unit; 254 . . . thickness calculating unit; 310 . . . light source; 320 . . . filter unit; 322 . . . first filter; 324 . . . second filter; 326 . . . third filter; 330 . . . rotation controlling unit; 410 . . . gap-controlling unit; 412 . . . first controlling unit; 414 . . . second controlling unit

What is claimed is:

1. A measurement device to measure a physical quantity of a measurement target with a sheet-like shape, the measurement device comprising:
a first integrating sphere which is separated by a gap from a first surface of the measurement target, has a first opening facing the first surface, and is not provided with a light detector to detect an intensity of light;
a second integrating sphere which is separated by a gap from a second surface of the measurement target, where the second surface is positioned opposite to the first surface, and has a second opening facing the first opening with the measurement target sandwiched therebetween;
a light source unit to emit light into the first integrating sphere;
a light detecting unit to detect an intensity of light inside the second integrating sphere; and
a calculating unit to calculate the physical quantity of the measurement target based on the intensity of light detected by the light detecting unit, wherein
the first integrating sphere includes a first shielding plate adapted to shield a part of the light emitted by the light source unit,
the second integrating sphere includes a second shielding plate adapted to reflect at least a part of the light inside the second integrating sphere to transfer the at least part of the light into the second integrating sphere, and
a length of the second shielding plate is identical to or smaller than a length of the first shielding plate in a longitudinal direction and a width direction of the measurement target.

2. The measurement device according to claim 1, further comprising a moving unit which moves the first integrating sphere and the second integrating sphere relative to the measurement target in a plane direction.

3. The measurement device according to claim 2, wherein the moving unit continuously moves the first integrating sphere and the second integrating sphere relative to the measurement target while the light detecting unit is detecting the intensity of the light.

4. The measurement device according to claim 2, wherein the moving unit includes:
a target-moving unit which moves the measurement target having a predetermined width in a longitudinal direction thereof; and
a head-moving unit which moves measuring heads provided with the first integrating sphere and the second integrating sphere in the width direction.

5. The measurement device according to claim 1, further comprising
a gap-controlling unit which maintains a gap between the first opening and the measurement target and a gap between the second opening and the measurement target by using air pressure.

6. The measurement device according to claim 5, wherein the gap-controlling unit keeps air pressure inside the first integrating sphere and the second integrating sphere above an outside air pressure.

7. The measurement device according to claim 1, wherein the light source unit emits, into the first integrating sphere, combined light obtained by modulating reference light and measurement light which have different optical wavelengths with different modulation frequencies from each other and combining the modulated reference light and measurement light, and the calculating unit is configured to:
- demodulate a light intensity of the combined light detected by the light detecting unit to calculate a light intensity of each of the reference light and the measurement light; and
- calculate the physical quantity of the measurement target based on an attenuation amount of the measurement light relative to the reference light.

8. The measurement device according to claim 7, wherein the calculating unit includes and uses a lock-in amplifier for demodulating the light intensity of the combined light detected by the light detecting unit for calculating the light intensity of each of the reference light and the measurement light.

9. The measurement device according to claim 1, wherein the physical quantity calculated by the calculating unit is a thickness of the measurement target.

10. The measurement device according to claim 9, wherein the calculating unit includes:
- a storage unit which stores a light intensity detected while a reference object with a known thickness is placed between the first opening and the second opening, and the known thickness of the reference object; and
- a thickness calculating unit which calculates the thickness of the measurement target based on a light intensity detected while the measurement target is placed between the first opening and the second opening, and on the light intensity and the known thickness for the reference object stored in the storage unit.

11. The measurement device according to claim 1, wherein a distance between the measurement target and the first shielding plate and a distance between the measurement target and the second shielding plate are substantially identical.

12. A measurement method to measure a physical quantity of a measurement target with a sheet-like shape, the measurement method comprising:
- emitting light into a first integrating sphere;
- detecting an intensity of light inside a second integrating sphere; and
- calculating the physical quantity of the measurement target based on the intensity of the light detected in the detecting, wherein the first integrating sphere is separated by a gap from a first surface of the measurement target, has a first opening facing the first surface and a first shielding plate that shields a part of the light emitted into the first integrating sphere, and is not provided with a light detector which detects the intensity of the light, wherein the second integrating sphere is separated by a gap from a second surface of the measurement target positioned opposite to the first surface, and has a second opening facing the first opening with the measurement target sandwiched therebetween and a second shielding plate that reflects at least a part of the light inside the second integrating sphere to transfer the at least part of the light into the second integrating sphere, and wherein a length of the second shielding plate is identical to or smaller than a length of the first shielding plate in a longitudinal direction and a width direction of the measurement target.

* * * * *